United States Patent [19]

Shellhause

[11] Patent Number: 5,133,439
[45] Date of Patent: Jul. 28, 1992

[54] FLUID PRESSURE ACTUATED ACTUATOR MECHANISM FOR CLUTCHES AND THE LIKE

[75] Inventor: Ronald L. Shellhause, Vandalia, Ohio

[73] Assignee: RMS Engineering, Inc., Vandalia, Ohio

[21] Appl. No.: 649,032

[22] Filed: Feb. 1, 1991

[51] Int. Cl.⁵ ............................................. F16D 25/08
[52] U.S. Cl. ............................. 192/85 C; 192/91 R; 192/98; 192/70.13; 192/DIG. 1; 92/52; 92/62
[58] Field of Search ............. 192/85 C, 85 CA, 91 R, 192/91 A, 98, 70.13, DIG. 1; 92/52, 62, 146

[56] References Cited

U.S. PATENT DOCUMENTS

| | | | |
|---|---|---|---|
| 2,873,834 | 2/1959 | Kepner | 192/85 CA X |
| 3,907,085 | 9/1975 | Rist | 192/91 A |
| 4,102,446 | 7/1978 | Rist | 192/91 A |
| 4,195,714 | 4/1980 | Massing | 92/52 X |
| 4,328,883 | 5/1982 | Shellhause | 192/85 CA |
| 4,991,702 | 2/1991 | Ladin | 192/85 C |

FOREIGN PATENT DOCUMENTS

| | | | |
|---|---|---|---|
| 571432 | 8/1945 | United Kingdom | 192/91 A |
| 1089624 | 11/1967 | United Kingdom | |
| 1255002 | 11/1971 | United Kingdom | 192/91 A |

*Primary Examiner*—Richard Lorence
*Attorney, Agent, or Firm*—D. D. McGraw

[57] ABSTRACT

A fluid pressure operated friction clutch actuating system for releasing the clutch includes a pressure operator, an actuator mechanism, which mechanism is shown as including a housing having a pair of telescopic pistons acting on a force transmission member and reacting through the actuator housing on an end wall of the clutch housing. The force transmission member has a U-shaped recess through which the clutch output shaft and the bearing retainer pass so that the force transmission member is in force transmitting engagement with the clutch throw out bearing while the system is in its operative position in the clutch housing. The actuator pistons act on the force transmission member when pressurized to move the throw out bearing to release the friction clutch through its belleville spring. The actuator housing and the force transmission member may be removed from the clutch housing through a clutch housing access opening by clamping them together to fully retract the pistons, moving them laterally so that the bearing retainer and clutch output shaft are no longer within the U-shaped opening, and then moving them laterally out through the access opening. When the fluid system is a sealed, ready-to-use system, it may be removed without disconnecting the operator and its supply tube from the actuator housing. The actuator mechanism composed of the force transmission member and the actuator housing and its internal components may be reinstalled by reversing the removal procedure. Location means are provided for locating the mechanism in the clutch housing so that the mechanism need not be otherwise fastened in place. The transmission does not have to be dropped and the output shaft and bearing retainer removed in order to remove the actuator mechanism from the clutch housing.

10 Claims, 2 Drawing Sheets

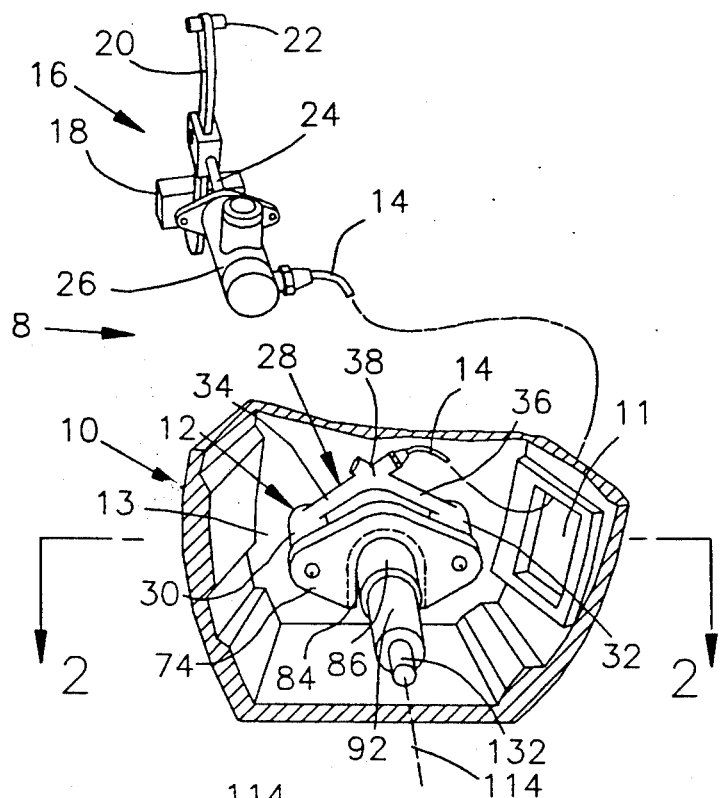
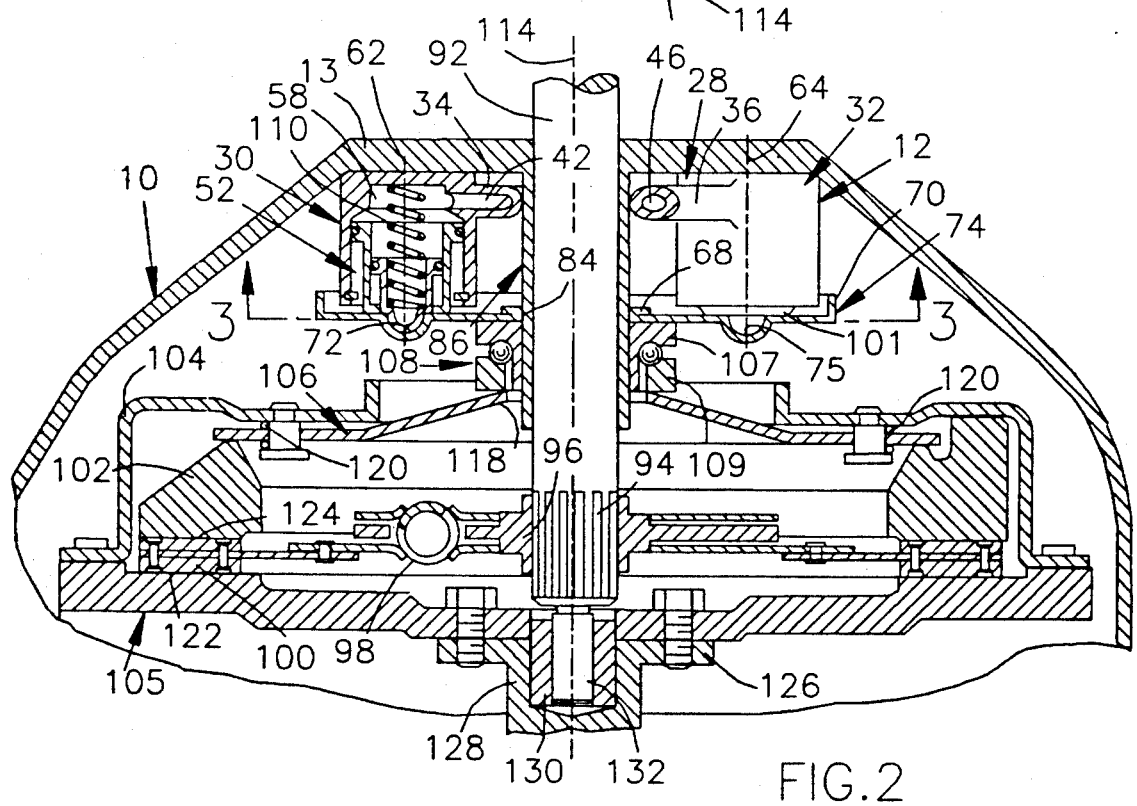
FIG. 1
FIG. 2

FLUID PRESSURE ACTUATED ACTUATOR MECHANISM FOR CLUTCHES AND THE LIKE

FIELD OF THE INVENTION

The invention relates to fluid pressure actuated actuator mechanisms for disengaging mechanically operated mechanisms such as clutches and the like, for engaging other similar mechanically released mechanisms, and for operating other mechanisms by fluid pressure. It is particularly related to such actuator mechanism for disengaging a friction clutch of the type commonly used in automotive vehicles and with other engine and transmission power trains.

BACKGROUND OF THE INVENTION

The predecessor clutch actuator mechanism of U.S. Pat. No. 4,328,883, entitled "Hydraulic Actuator Mechanism for a Friction Clutch" and issued May 11, 1982, in the name of the inventor of the invention herein disclosed and claimed, provides the background for this invention. That disclosure provided an earlier designed hydraulic pressure operated mechanism disposed between the master cylinder manual clutch operator and the clutch throw out bearing. Other related patents are included in the patent references made of record in the above-noted U.S. patent.

The clutch actuator mechanism of the above-noted U.S. patent mounts the hydraulic clutch actuator about the clutch output shaft and bearing retainer. The hydraulic clutch actuator is secured to the end wall or cover plate of the clutch bell housing. Because the member transmitting forces from the hydraulically actuated pistons of the actuator to the throw out bearing is secured to the pistons, and that member also receives the clutch output shaft through a circular, completely encompassed, opening, and the actuator is secured to the end wall or cover plate, the only way that the actuator can be removed for repair or replacement is to remove the transmission from the clutch housing. This involves disconnecting the transmission output shaft from the drive shaft leading to the differential of a typical rear wheel drive automobile, or the constant velocity joints and shafts of a front wheel drive automobile, moving the transmission rearwardly to remove its input shaft (which is the clutch output shaft) from the clutch housing, dropping the transmission so as to access the clutch housing cover plate, removing the mounting bolts holding the actuator and the bearing retainer as well as the cover plate, and sliding the actuator out of the clutch housing. In some instances, after removing the mounting bolts holding the actuator and the bearing retainer to the clutch housing end wall, those elements may then be moved through an access opening in the side, top or bottom of the clutch housing. However, this can only occur after the bearing retainer and the transmission output shaft have been removed from extending through the force transmission member connecting the hydraulic pistons to the throw out bearing. While the structure disclosed in that patent may include a sealed, ready-to-use hydraulic system which is installed in the clutch housing before the transmission is in place or is returned to its normal operative position, the actuator mechanism still cannot be installed, removed, repaired or replaced while the transmission is in its operating position in relation to the clutch housing and the clutch mechanism.

Other installations commonly found on some automotive vehicles have a hydraulic clutch master cylinder operating a servo mounted outside the transmission, with the servo stroking an intermediate rod which moves a throw out bearing fork to move the throw out bearing, all in the same manner as earlier purely lever-operated types of clutch disengagement mechanisms. Such installations have all the adverse features of such lever-operated mechanisms, and have done little if anything to improve the overall system efficiency, assembly, removal, repair and replacement of the mechanism within the clutch housing.

SUMMARY OF THE INVENTION

The actuator mechanism embodying the invention permits the fluid pressure actuator, such as a hydraulic clutch actuator, to be installed in a previously assembled clutch housing with its clutch including its bearing retainer and throw out bearing in place, as well as the clutch output shaft, which is usually the transmission input shaft, extending through the bearing retainer, the throw out bearing, the friction clutch, and being journaled in the flywheel or engine crankshaft at its output end. It adapts to the space available in a typical clutch housing having the typical jack shafts and pivoted fork acting on the throw out bearing through a mechanical or a hydraulic linkage, all the while providing the above described ease of installation, removal and replacement. It still provides the necessary stroke to fully release the clutch when it is actuated at any time throughout the wear life of the clutch facings, yet telescopes axially to decrease its maximum axial thickness to considerably less than that available space, even when that space is near a minimum when the clutch facings are worn.

This telescoping action may be readily accomplished by use of a forceps-like clamping tool or other similar well-known tools, clamping against the actuator housing and the force transmitting means to telescope the pistons inwardly. The tool preferably continues to grip these elements and hold them in place against any reexpansion of the pistons by the piston springs. In so doing, it also easily acts as a handle to manoeuver them within the clutch housing and remove them from the clutch housing. The actuator housing, pistons, cylinders and the force transmitting means between the pistons and the throw out bearing can be moved axially and translationally within that space and out of a typical side access opening in the clutch housing. The fluid pressure conduit to the actuator from the operator mechanism, typically a somewhat flexible tube or pipe capable of withstanding the pressures generated therein with safety, is opportunely routed through the access opening, and may be provided with a dust boot or cover which closes the access opening while protecting the interior of the clutch housing from road debris, moisture and other external hazards.

When the actuator mechanism includes a sealed system which is ready to install and use, the actuator housing and the force transmission member are inserted in place in the clutch housing through the access opening with the clamping tool in place. The clamping tool's clamping action is then released, the pistons expand under the force of the piston springs, and the actuator housing and the force transmission member are readily located in place axially and radially by location means provided without requiring bolt-down fasteners on the end of the clutch housing or elsewhere. The operator mechanism and connecting tube or pipe are placed in position and the boot, which may have been preassembled on the tube or pipe before completing the preassembly of the system and charging and sealing of the entire unit, is secured in place. Advantages obtainable by employment of the structure embodying the invention are numerous. They include:

(1) Simpler initial installation.

(2) Elimination of external and internal threaded fasteners to hold the actuator housing and the force transmission member in place.

(3) Freedom to schedule installation of the actuator mechanism, and even an entire sealed system, on a production line before or after installation of the clutch housing and the transmission in place.

(4) Time saving when repairs must be made to the actuator, by just removing the actuator from the clutch housing without having to disconnect and drop the transmission, remove the actuator, repair it or provide another one, reinstall it, and then reinstall and connect the transmission.

(5) Much of the actuator mechanism may be made of cast, stamped or reinforced molded plastic parts, including the actuator housing as well as the cylinders and pistons, with appropriate wear surfaces of metal or other acceptable materials being provided at the points of engagement of the pistons with the force transmission member. Judicious selection of such materials can materially reduce costs and weight, and increase ease of manufacture, assembly, repair or replacement, and installation.

(6) It performs more efficiently than other, more complicated devices without the complexity and losses of time, materials and effort of prior designs.

Other advantages available by practice of the invention will become evident with a full understanding of the description and drawings, and the drawings themselves, as provided hereafter.

BRIEF DESCRIPTION OF THE DRAWINGS

FIG. 1 is a perspective view, with parts broken away and shown in section, schematically showing a clutch disengagement assembly containing the invention, with the clutch elements having been removed for clarity. The inventive structure of the actuator mechanism is shown in position in the clutch housing, with the remainder of the fluid actuating and release system which is a part of the total invention also being shown schematically.

FIG. 2 is a schematic cross-section view with parts broken away, taken in the direction of arrows 2—2 of FIG. 1 and showing the mechanism embodying the invention in the clutch engaged position and the condition of actuator operation when the fluid pressure actuated pistons are not pressurized. The Figure also shows a simple housing tapered-side type of location for the closed ends of the cylinders and therefore locates the actuator housing in axial and transverse relation to the clutch housing.

DETAILED DESCRIPTION OF THE PREFERRED EMBODIMENTS

Figure 3:
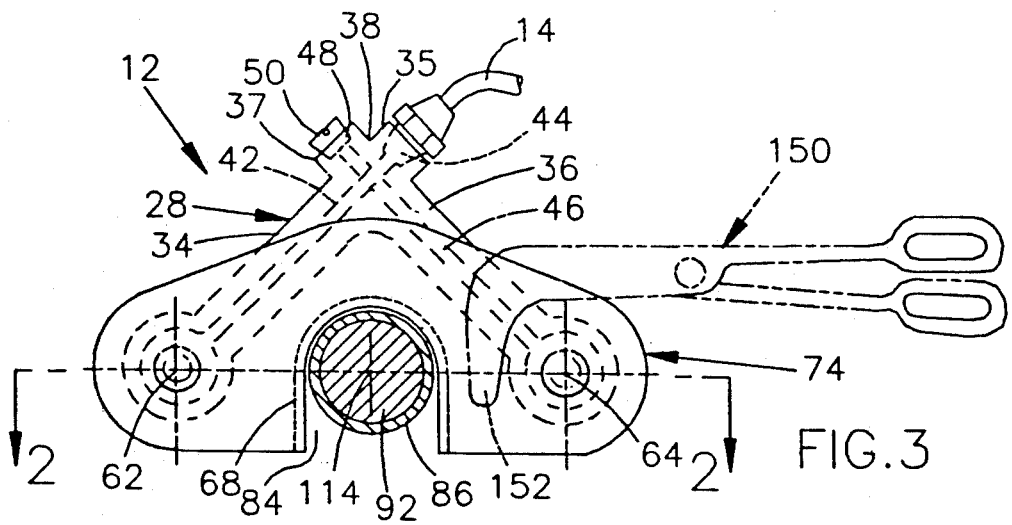
FIG. 3 is a fragmentary cross-section view taken in the direction of arrows 3—3 of FIG. 2 and illustrating the actuator housing mechanism and the force transmission member from an axial viewpoint. It schematically shows a tool used for removal and installation of that mechanism and member.

The fluid pressure actuated assembly 8 of FIG. 1 schematically illustrates the inventive mechanism with the friction clutch mechanism being omitted for clarity. FIGS. 2, 3, 4 and 5 illustrate other aspects of the inventive mechanism, including in FIG. 2 a schematic, somewhat simplified, showing of the friction clutch of the assembly.

A transmission bell housing 10, which is the clutch housing for friction clutch 13 and its actuating mechanism, has a fluid pressure clutch actuator 12 therein. The actuator 12 is connected by a fluid pressure conduit 14 such as a preferably flexible tube or pipe to a fluid pressure operator, shown schematically as a manually operated pedal mechanism 16. Mechanism 16 is shown as including a foot pad 18 mounted on a pedal lever 20 which is pivoted on a pin 22 and drivingly connected to a push rod 24. The push rod 24 is shown as being connected to act on a master cylinder 26.

While it is often preferable to use a sealed, precharged master cylinder, a master cylinder of the conventional type used to operate clutches and brakes for many years may be used. A master cylinder capable of being used in a sealed system is shown in U.S. Pat. No. 3,573,725, by way of example. Other sealed reservoir master cylinders may be used. Instead of using a master cylinder, other controlled sources of fluid pressure may be used, with appropriate valving and control technology applied to operate the fluid pressure system. For example, a computer-controlled manual-type transmission which is automatically shifted as needed may control the application and release of fluid actuating pressure to the clutch actuator, giving the effect of a completely automatically shifting transmission while actually employing the same type of transmission that has been commonly used for some years with manual shifting and separate vehicle driver clutch operation.

The pressure generated in the master cylinder or other fluid pressure source 26 is delivered through the tube or pipe 14 to the actuator 12. Actuator 12, variously shown in FIGS. 1 through 4, includes a housing 28 which has a pair of upstanding cylinders 30 and 32 formed on the remote ends of and interconnected by arms or extensions 34 and 36. It should here be noted that a pair of such cylinders, properly positioned with their axes in planar alignment with the axis of the throw out bearing, are quite satisfactory and usually sufficient. If for some reason one or more additional cylinders and piston assemblies were found to be desirable, such a configuration would be within the concept of the invention so long as the necessary structures to permit the removal and replacement of the appropriate elements as disclosed and claimed herein, are provided. Arms 34 and 36 are preferably integrally formed, being joined in an X-like configuration near their adjacent ends 35 and 37 to form a common end junction 38. Arm 34 has a fluid passage 42 formed therein extending the length of that arm from arm end 35 where the passage end 44 is located, and terminating at its connection to cylinder 30. Arm 36 has a similar fluid passage 46 formed therein and extending the length of that arm from its end 37 where the passage end 48 is located, and terminating at its connection to cylinder 32. Passages 42 and 46 intersect in junction 38. When the housing 28 is a precast housing, the passages 42 and 46 may also be precast, or they may be drilled from their ends 44 and 48. When the housing 28 is made of molded reinforced plastic, the passages 42 and 46 are usually molded in place. When the housing 28 is made of mating sheets, the sheets are cooperatively shaped to provide passages 42 and 46 as well as other parts of the housing. The end 48 of passage 46 is shown as being closed by a plug 50, while the end 44 of passage 42 is shown as receiving a fitting which connects tube 14 to passage 42 and thus also to passage 46 and the interior of cylinders 30 and 32. Thus when fluid pressure is introduced through tube 14 to passage 42, both passages 42 and 46 as well as cylinders 30 and 32 are simultaneously pressurized. As is shown in the above-noted U.S. Pat. No. 4,328,883, once the fluid pressure is delivered to the housing 28, there are no external passages through which the pressure must be transmitted and therefore the likelihood of leakage is considerably reduced.

A piston assembly 52 is located in cylinder 30. Assembly 52 includes the cylinder side wall 54 in which pistons which are parts of assembly 52 are directly or indirectly received. The cylinder also has an end wall 56 which closes one end of the cylinder. The opening of passage 42 into the cylinder chamber 58 is preferably immediately adjacent end wall 56. A similar cylinder chamber 60 is formed in cylinder 32. End wall 56, side wall 54 and the pistons of assembly 52 cooperate to define chamber 58 as a pressure chamber in which fluid pressure introduced therein acts on the pistons effectively along the axis 62 of the cylinder 30 and the piston assembly 52, with the result that will be later described. Similarly, pressure introduced into pressure chamber 60 acts on the piston assembly 76 of cylinder 32 effectively along the axis 64 of cylinder 32 and piston assembly 76.

Piston assembly 52 also includes the intermediate piston 78 which has an external flange 80 provided with an O-ring seal 81. Piston 78 is an annular piston with an inner cylinder side wall 77. Piston 78 is reciprocally and sealingly received in cylinder side wall 54 with seal 81 sealing against fluid leakage so that the piston may be moved in a direction away from cylinder end wall 56 under the influence of fluid pressure in chamber 58. The stroke of piston 78 is limited by the piston stop 82 which is engaged by the piston flange 80 when the piston reaches its full stroke. Piston 78 has at its end opposite flange 80 an inwardly turned flange 79 which acts as a piston stop for output end piston 83.

Piston assembly 52 also includes the output end piston 83 positioned coaxially along axis 62 with and inside piston 78. Piston 83 has an open end 85 surrounded by an external flange 87 having an O-ring seal 89 similar to flange 80 and seal 81 of piston 78. Seal 89 reciprocally seals against the cylinder side wall 77 of piston 78. Piston 83 has a closed end 91 formed to provide an annular spring seat 93 and a location protuberance or ball end 95.

While the interior of cylinder 32 is not shown, it is of the same construction as the interior of cylinder 30, and its output end piston 97 has a similar location protuberance or ball end 99. The inturned flange 101 of its intermediate piston (not otherwise shown), like the inturned flange 79 of piston 78, also provides a piston stop for its piston 97. Also like flange 79, flange 101 is adapted to engage the force transmission member 74, to be further described, in force transmitting relation when chamber 58 of cylinder 30 and the similar chamber of cylinder 32 are pressurized. Spring 110, located in cylinder chamber 58, seats against the cylinder end wall 56 and the annular seat 93 of the output end piston 83. A similar spring is contained and similarly arranged in cylinder 32. Spring 110 and its counterpart in cylinder 32 are light compression springs, each exerting only a few pounds of force on the output end pistons 83 and 97 so that the external shoulders of pistons 83 and 97 surrounding ball ends 95 and 99 are in light force transmitting engagement with the force transmission member 74 so as to continually urge member 74 in the clutch releasing direction as will be further described as to purpose.

The force transmission member 74 is a yoke preferably made of stamped sheet metal. It is elongated and has generally flat surfaces 71 and 73 on either side. Socket-like indentations 72 and 75 on the side thereof forming surface 71 are normally engaged by the ball ends 95 and 99 of pistons 78 and 83 in a ball-and-socket relationship which locates the member 74 axially and transversely relative to those pistons and yieldingly holds that relationship. Surface 71 is also engaged by piston 97 and the piston of which flange 101 is a part.

Figure 4:
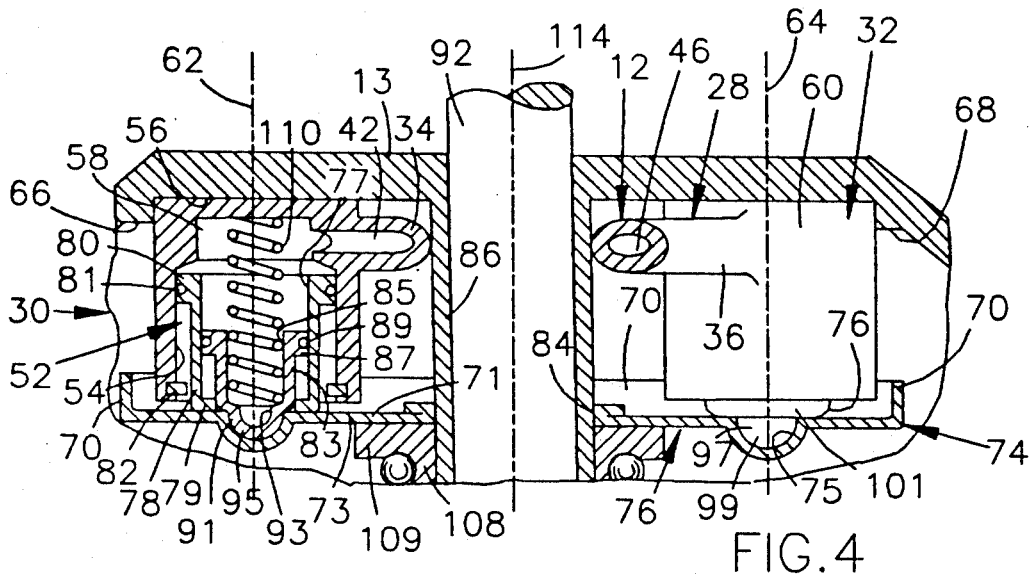
FIG. 4 is an enlarged schematic cross-section view similar to FIG. 2, showing the mechanism embodying the invention in the actuator actuated, and therefore clutch released, position. The Figure also shows simple housing interrupted-ledge or interrupted-flange type of side locators for the closed ends of the cylinders, with those cylinder closed ends abutting the end wall of the clutch housing and being engaged on the cylinder sides by the locators, locating the actuator housing in axial and transverse relation to the clutch housing.
Figure 5:
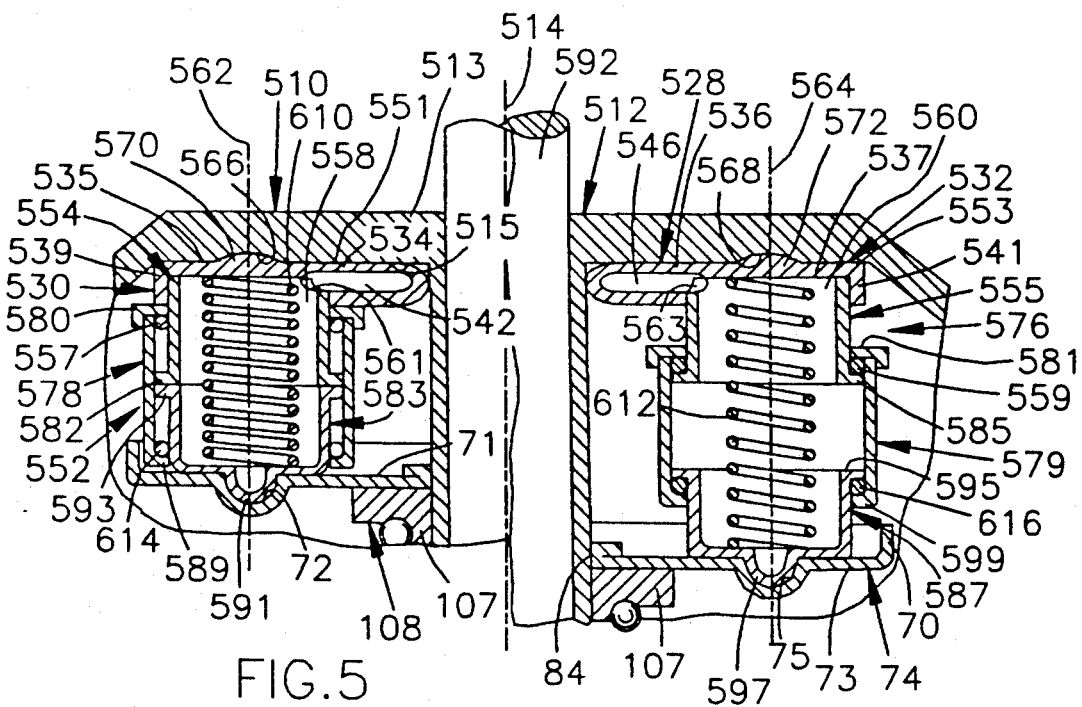
FIG. 5 is an enlarged schematic cross-section view similar to FIG. 4, showing one cylinder of a modified actuator housing, cylinder and piston mechanism in the actuator released, clutch engaged, position and the other cylinder of that modified mechanism in the actuated actuator, clutch disengaged, condition of operation. It also shows yet another actuator housing locator arrangement for locating the housing in its operating position in the clutch housing.

A U-shaped opening 84 is provided in the center of member 74, equally spaced from indentations 72 and 75, with the center of the curvilinear end of opening 84 being on a line joining the axes of the indentations 72 and 75. In its installed position shown, the center of the curvilinear end of opening 84 may also be coincident with the axis 114 of shaft 92 to be described. The axes of indentations 72 and 75 are coincident with the cylinder and piston axes 62 and 64 when the piston ball ends are seated in the socket-like indentations as shown. The mouth of opening 84 is formed through one edge of member 74 in a direction perpendicular to its elongated axis, which is the above-described line joining the axes of indentations 72 and 75. That line and axis lies on and is coincident with the section line 4—4 of FIG. 3. Of course, the opposite surface 73 of member 74 has protrusions thereon which are the obverse sides of the indentations 72 and 75. Member 74 preferably has a stiffening flange 70 formed about its external edge, and may have one 68 around its opening 84. If such a stiffening flange 68 is around opening 84, it must extend from side surface 71 or else the throw out bearing to be described and which is engaged by member 74, must be grooved or hollowed out in a complementary manner to accommodate the flange. The flange 68 may have an interruption on either side at the juncture of the curvilinear portion of the opening with the straight part of the opening unless the bearing is cooperatively grooved to accommodate the straight part of the flange. Such grooved accommodation is shown only in FIG. 2. In FIGS. 4 and 5 the flange around the opening 84 has been omitted. If one were to be found desirable, it would more easily be accommodated on side surface 71 of member 74.

A bearing retainer 86 is schematically shown in the drawings. It is functionally a part of the end wall 13 of the clutch housing 10, and may be removably attached to that wall in the manner shown in the above-noted U.S. Pat. No. number 4,328,883. However, it does not have to be removed to remove or install the actuator housing 28 and force transmission member 74 because of the features of the herein disclosed and claimed invention. For that reason, for the sake of schematic simplicity where reasonable, and because its effectively so functions in the installed clutch assembly, bearing retainer 86 is illustrated as a part of clutch housing end wall 13.

The throw out bearing 108 is schematically illustrated in the drawings. It fits about the bearing retainer 86 and the clutch output shaft 92. It is axially slidable on the bearing retainer. It's inner race 107 is engaged by surface 73 of the force transmission member 74 in force transmitting relation. Its outer race 109 is engaged by the annulus formed by the inner annulus 118 of belleville spring washer 106. Inner annulus 118 may be made up of the ends of fingers formed by radial splits, not shown, in washer 106 when such fingers are desired. Otherwise inner annulus 118 is an uninterrupted annulus engaging the bearing race 109. The force of spring 110 acting on piston 83 and the similar spring, not shown, acting on piston 97 is usually on the order of about four pounds total, which is enough force to keep the outer bearing race 109 from slipping relative to belleville spring washer inner annulus 118 but is not sufficient force to cause the belleville spring washer to pivot on its pivot ring 120 and allow movement of the clutch pressure plate 102 to disengage the clutch.

The friction clutch 13 includes the clutch output shaft 92, which may also be the transmission input shaft, the clutch hub 96 fitted on splines 94 of shaft 92 and connected through the conventional spring damper 98 with a clutch friction disc 100. Disc 100 has opposed friction faces 122 and 124 on it. Friction face 122 is engageable with a mating surface on flywheel 105, and friction face 124 is engageable with a mating surface on clutch pressure plate 102. Clutch housing and belleville spring washer support member 104 is secured to flywheel 105 for rotation therewith. Member 104 has belleville spring washer 106 secured to it in pivotal relation about pivot ring 120. Therefore belleville spring washer 106 rotates with the flywheel and drives the bearing outer race 109 for rotation with it.

Flywheel 105 is schematically illustrated as being bolted to a flange 126 on the engine output shaft 128. Flywheel 105 and engine output shaft 128 also have a journal 130 receiving a pilot end 132 of shaft 92. Journal 130 is a bearing permitting relative rotation of shaft 92 and flywheel 105 when the friction clutch is disengaged.

FIG. 5 shows a modified piston arrangement as well as a modified arrangement for providing location of the actuator housing 528 on the clutch housing end wall 513. Reference numerals comparable to those used in the other Figures are used where appropriate, but are in the five hundred and six hundred numerical series generally used in FIG. 5. The bell housing 510 end wall 513 has an inner surface 515 provided with spherical segment depressions 566 and 568 on axes 562 and 564. These axes are also the axes of the cylinders 530 and 532 when the actuator housing 528 is installed in its operative position shown. The outer surfaces 551 and 553 of cylinder end walls 535 and 537 are respectively formed with spherical segment ball-end protrusions 570 and 572 respectively on the cylinder axes 562 and 564. They are part of the location means for actuator housing 528.

The bearing retainer 586 is again schematically illustrated, and is similar to the bearing retainer 86 of the other Figures. Clutch output shaft 92, having a longitudinal axis 114 as before mentioned, extends through the bearing retainer 86 in the same manner as in the earlier Figures.

The yoke-like force transmission member 74 is shown in its installed position as earlier described. Its generally U-shaped recess 84 loosely fits about the outer surface of the bearing retainer 586. As earlier described, it has indentations 72 and 75 in its surface 71 for receiving the matable closed ends 91 and 97 of the output pistons. In the construction of FIG. 5, it receives the matable piston ball ends 591 and 597 described below.

The actuator housing 528 is similar to housing 28 of the earlier Figures, with some modifications to the cylinders 530 and 532 formed on the remote ends of the arms 534 and 536 of the housing 28. Except for the cylinder changes noted below, the arms 534 and 536 of housing 528 may be the same as arms 34 and 36 of housing 28. Therefore such other common details of the housing are not further shown and described in detail. Arms 534 and 536 respectively have passages 542 and 546 formed therein. These passages open into the cylinders 530 and 532 adjacent their respective closed end walls 535 and 537. The cylinder side walls 539 and 541 respectively extend longitudinally from the cylinder end walls 535 and 537 and are longitudinally much shorter than the comparable side walls of the cylinders of the earlier Figures.

The cylinder side walls 539 and 541 are extended by providing insert cylinder sleeves 554 and 555. Each sleeve is functionally part of its associated cylinder, but is also considered to be an element of the piston assembly of its cylinder because of their cooperation with the pistons to be described. Sleeves 554 and 555 are appropriately secured in the cylinder side walls 539 and 541 by suitable means not shown. They may be welded, press fitted, fastened by adhesives, threaded in place, or otherwise secured. The sleeves have recesses 561 and 563 in their ends abutting the cylinder end walls 535 and 537. Recesses 561 and 563 mate with the openings of passages 542 and 546 so that fluid pressure from the mechanism 16 is transmitted to the cylinder chambers 558 and 560 formed by the cylinders 530 and 532. For this purpose, sleeves 554 and 555 are respectively considered to be parts of cylinders 530 and 532. Sleeves 554 and 555 respectively have external flanges 582 and 585 formed thereon to act as piston stops. They also act as seal engaging surfaces as will be described.

Intermediate pistons 578 and 579 are also formed as sleeves, with their respective inwardly extending flanges 580 and 581 formed thereon which being slidably mounted on the outer surfaces of the sleeves 554 and 555. O-ring seals 557 and 559 are respectively received between sleeves 554 and 578, and sleeves 555 and 579. In the inactive position of the actuator, they are positioned against flanges 580 and 581, but are located in axially spaced relation to flanges 582 and 585, as seal 557 is shown in relation to flanges 580 and 582 in FIG. 5. When the actuator is actuated by fluid pressure, they move with flanges 580 and 581 as the pistons or sleeves 578 and 579 are moved, to as far as the full stroke position shown in the right side of FIG. 5, if such full stroke is necessary. At that time they also engage flanges 582 and 585 respectively, acting as sealed cushion stops for sleeves 578 and 579.

As the pressure in the chambers 558 and 560 is being released, but before it reduces below the level where it no longer has a force-generating effect, it acts to move the seals 557 and 559 toward the cylinder end walls 535 and 537 because that pressure passes around flanges 581 and 585, those flanges not being in sealing relation with the inner walls of intermediate pistons 578 and 579. Sleeves 578 and 79 are moved toward the cylinder end walls 535 and 537 by the force stored in the clutch belleville spring. This force acts on the outer end pistons 583 and 587 and then, after pistons 583 and 587 are moved inwardly of piston sleeves 578 and 579 until their respective outwardly extending flanges 593 and 595 respectively abut flanges 582 and 585 of sleeves 578 and 579, also acts on the inwardly turned flanges 589 and 599 respectively formed on the opposite ends of piston sleeves 578 and 579 from their flanges 580 and 581. Similar movements of the pistons and seals occur when preparation for removing the actuator mechanism is begun by clamping the force transmission member 74 and the housing 528 together and forcing the pistons to their fully retracted positions as shown in the left side of FIG. 5. At all times, the light compression springs 610 and 612 urge the pistons toward their fully expanded positions, functioning in the same manner as spring 110 and its comparable spring in cylinder 32 do, described above. Spring 610 reacts on the end wall 535 of cylinder 530 and spring 612 reacts on the end wall 537 of cylinder 532.

O-ring seals 614 and 616 are received about the outer surfaces of outer end pistons 583 and 587 and axially between flanges 589 and 593, and flanges 599 and 595, respectively. Seals 614 and 616 tend to remain in engagement with flanges 589 and 599 at all times due to the pressure in chambers 558 and 560 when pressure is present there, and are not caused to move otherwise when no pressure is present there.

Output end pistons 583 and 587 have ball-like ends 591 and 597 which mate with depressions 72 and 75 of force transmission member 74 when that member is in place so that the ball-like ends and the depressions are axially aligned and in engagement. This occurs while the member 74 and the housing 528 are clamped together as above described, and so long as the actuator mechanism is installed in its operative position as shown in FIG. 5. These depressions 72 and 75 and ends 591 and 597 provide for proper location of the force transmission member 74 and therefore the actuator housing 528, with its cylinders and pistons, relative to the throw out bearing 108 and the clutch housing end wall 513. With the location means of 566, 570 and 568, 572 above described, the actuator mechanism is properly located and retained in position.

Because of the less-than-hemispherical spherical segment shapes of the ball-like ends 570 and 572 and depressions 566 and 568, the pistons and actuator housing can be cammed out of the depressions 566 and 568 (if ends 570 and 572 are not already completely axially clear of those depressions) when the spring and pressure forces are prevented (by action of the clamping tool as more fully described below) from urging the ball-like ends into the depressions, so that the actuator mechanism is easily moved laterally for removal purposes.

The inner race 107 of throw out bearing 108 is shown on the left side of FIG. 5 as being slightly spaced from the force transmission member 74, this being the case when the pistons are fully retracted by the clamping tool 150 against springs 610 and 612 in preparation for removal, as is more fully described below. The space is created because the belleville spring washer 106 of the friction clutch (shown in FIG. 2 but also used with the structures shown in FIGS. 3, 4 AND 5) has reached its maximum stroke in the direction of the clutch housing end wall 13 or 513. In the usual condition of operation, the force transmission member 74 is lightly held against the throw out bearing inner race 107 to transmit sufficient force to the outer race 109 (shown only in FIG. 1) to prevent the inner annulus 118 of the belleville spring 106 from having a different rotation from the outer race 109 while the friction clutch is in its usual engaged condition, as described with regard to the earlier Figures.

Removal of the actuator housing mechanism 12 begins with the use of a clamping tool such as the tool 150 schematically shown in FIG. 3 as a forceps-like tool. A useful variation of the type of tool known as Vice Grips may be used, by way of example. In the field, simpler tools such as long-nosed channel locks may even be used. Such tools must be able to be inserted through the access opening of the clutch housing, clamp the force transmission member 74 and the actuator housing 28 or 528 more closely together to the retraction limits of the pistons in the actuator housing, and hold that clamping action while the actuator mechanism is manoeuvered away from the bearing retainer and then out of the access opening.

The clamping end 152 of the clamping tool 150 is inserted into access opening 11 and positioned around the force transmission member 74 and a suitable accessible part of the housing 28 such as arm 36 so that, when the tool is clamped, it squeezes the force transmission member in the direction of axes 62 and 64 to move the pistons 52 and 76 inwardly of the cylinders 30 and 32 to and slightly beyond the position shown in FIG. 4, fully retracting the pistons and relieving the axial forces on the clutch housing end wall 13 as well as on the throw out bearing 108.

With the tool 150 still gripping the member 74 and the housing 28, the temporary unit formed by the tool 150, the member 74 and the housing 28 is moved laterally or translationally outward until the bearing retainer 86 and the shaft 92 are no longer within any part of the opening 84. Once they are clear of the force transmission member 74, the unit is then moved laterally or translationally outward through the access opening 11 through which the tool 150 extends. The actuator mechanism in housing 28 and the force transmission member may then be examined, repaired as needed, and replaced in the clutch housing 10, or a new mechanism or force transmission member, or both, may be installed. Throughout the removal and replacement operations, the flexible tube or pipe 14 may remain secured to inlet port 44 if desired.

If the actuator is part of a sealed system as discussed above, the new or reconditioned system is properly filled with appropriate fluid, bled as needed, and sealed so that it is ready for use. It may be returned to stock for later use or immediately installed.

Installation is essentially the reverse of removal. The clamping tool again clamps and compresses the force transmission member 74 and the actuator housing 28, collapsing or retracting the piston assemblies 52 and 76, or 552 and 576, into the cylinders until the unit formed by member 74 and housing 28 or 528 again has a thickness which is less than the minimum axial space available in the clutch housing between the throw out bearing 108 and the clutch housing end wall 13 or 513. The unit is then inserted through access opening 11 until the force transmission member opening 84 is positioned over the bearing retainer 86 so as to be able to receive the retainer in it. The unit is then moved laterally or translationally, such movement then basically being radially toward the axis 114, until opening 84 fits over the bearing retainer 86 as shown in FIG. 3. In this position, the cylinders 30 and 32, or 530 and 532, are in position on the end wall 13, and are located there against lateral movements by the appropriate location means such as any of those shown in the drawings. When the location means of FIG. 5 are used, the ball ends 570 and 572 tend to move into their fully seated positions, so long as they are at least partially aligned with the depressions, as the clamping tool 150 is released and the piston springs 610 and 612 expand the pistons.

Mechanism embodying the invention clearly renders removal and installation much easier than before while providing a less complicated structure. It obviates the need to remove and replace the transmission in order to move and replace the actuator mechanism in housing 28 or 528, which has been one of the major reasons that the structure of the above-noted U.S. Pat. No. 4,328,883 and other similar structures have not been used commercially with any success.

I claim:

1. A fluid pressure actuated actuator mechanism for operating a mechanism by fluid pressure, the mechanism to be operated by said actuator mechanism including a housing within which said actuator mechanism is to be mounted for operation and a shaft in that mechanism housing about which said actuator mechanism is to be mounted for operation and removed for service, said actuator mechanism comprising:

a generally V-shaped housing having fluid pressure cylinders on its outer ends with pistons telescopically received therein and having piston output ends and base ends, fluid pressure passages in said housing connecting said cylinders and having input port means adapted to receive fluid actuating pressures therethrough for actuating said pistons in said cylinders;

and force transmitting means removably located on said piston output ends for actuating movement to transmit pressure-generated output forces from said pistons to a mechanism to be operated by said actuator mechanism, said force transmitting means being adapted to mate with such a mechanism to be operated for operational use therewith and further being adapted to be moved axially and transversely relative thereto, together with the remainder of said actuator mechanism, for disengagement of said force transmitting means and the remainder of said actuator mechanism from the mechanism to be operated by said actuator mechanism; said force transmitting means having a generally U-shaped open recess formed therein and adapted to receive therethrough the shaft of the mechanism to be operated by said actuator mechanism while said actuator mechanism is received and mounted in operatable relation within the housing of the mechanism to be operated by said actuator mechanism said actuator mechanism including said force transmitting means being adapted, because of said generally U-shaped open recess and after said disengagement with the mechanism to be operated by said actuator mechanism, to be removed from such a mechanism to be operated without requiring disassembly of said actuator mechanism or disassembly of such a mechanism to be operated by said actuator mechanism, and without requiring removal of such a mechanism to be operated from its installed location and position in order to remove and replace said actuating mechanism.

2. The fluid pressure actuated actuator mechanism of claim 1 further including fluid pressure operator means providing a source of controlled fluid pressure, fluid conduit means having parts connecting said operator means and said input port means in fluid pressure transmitting relation, and fluid sealed in said operator means and said conduit means and said passages and said cylinders, the part of said fluid conduit means connecting with said input port means being removable from the mechanism to be operated by said actuator mechanism concurrently with said force transmitting means and the remainder of said fluid pressure actuator mechanism while remaining connected to said input port means and said operator means and maintaining said fluid sealed condition throughout removal and during later reinstallation.

3. A fluid pressure operated actuator mechanism for a friction clutch located in a clutch housing, the clutch housing having an access opening for installation, removal and replacement of the fluid pressure operated actuator mechanism and an end wall axially spaced from the friction clutch and providing force reaction for said fluid pressure operated actuator mechanism, an output shaft extending from the friction clutch through the clutch housing end wall, the friction clutch including a clutch spring disposed coaxially with the output shaft for engaging the clutch and an axially movable bearing member extending coaxially about the output shaft and being operatively connected with the clutch engaging spring, the clutch being manually released by actuation of said fluid pressure operated actuator mechanism, said fluid pressure operated actuator mechanism comprising:

an actuator mechanism housing positioned in radially spaced relation to the output shaft and having a plurality of cylinders each having an axis parallel with the axis of the output shaft, said actuator mechanism further having a plurality of intersecting internal fluid passages interconnecting said cylinders, at least one of said fluid passages having an input port for receiving actuating fluid pressure for both of said passages and said cylinders;

a plurality of telescopic piston assemblies slidably disposed in respective ones of said cylinders, each of said piston assemblies having a base end and a movable output end, each of said output ends having locating means formed thereon, the full axial stroke of said piston assemblies being sufficient to release the friction clutch under all operational conditions and the retracted position of said piston assemblies in said cylinders rendering the maximum axial thickness of said fluid pressure actuated actuator mechanism sufficiently less than the axial thickness of the space between the friction clutch and the clutch housing end wall to permit transverse movement of said fluid pressure actuated actuator mechanism for installation, removal and relacement without removal of the clutch housing and friction clutch from their installed condition;

force transmitting means having a generally U-shaped open recess receiving the output shaft therethrough, said force transmitting means further having locating means operatively engaging said piston locating means, said force transmitting means abutting the bearing member in compressive force transmitting relation so that said pistons and said force transmitting means and the bearing member are in compressive force transmitting relation and said force transmitting means is located in a predetermined position relative to said cylinders and the bearing member and the output shaft in which the axes of the output shaft, said cylinders and the bearing member are coplanar;

said force transmitting means, together with said actuator mechanism housing and said pistons, being transversely removable as a unit from about the output shaft and out of the clutch housing access opening, and also being installable into the clutch housing through the access opening and then about the output shaft, while said force transmitting means is being held in compressive relation to said pistons with said pistons retracted into said cylinders;

and fluid pressure operator means in fluid communication with said internal passages through said input port for selectively supplying fluid pressure through said internal passages to said cylinders so that said pistons will be extended to operate the clutch spring through said force transmitting means and the bearing member to disengage the clutch, the clutch spring being operable to cause retraction of said pistons in said cylinders and engage said clutch when the fluid pressure in said cylinders is released.

4. The fluid pressure actuator mechanism of claim 3 in which the clutch housing end wall has location means thereon receiving a portion of said actuator mechanism housing in axial and transverse relation and further locating said actuator mechanism axially and transversely relative to said clutch housing and said friction clutch so that said actuator mechanism is in operable axial alignment with said clutch for operation of said clutch.

5. The fluid pressure actuator mechanism of claim 3 in which said actuator housing is generally V-shaped and said pluralities of cylinders, intersecting internal fluid passages, and telescopic piston assemblies are limited to one pair of each of same.

6. The fluid pressure actuator mechanism of claim 3 in which each of said piston assemblies has a base end forming a pressure-receiving chamber in fluid communication with one of said actuator housing internal fluid passages and defined at least in part by an end wall of said cylinder, a movable intermediate portion mating with said base end in sealed but axially movable relation, and a movable output end mating with said intermediate portion in sealed but axially movable relation, and each of said output ends having locating means formed thereon.

7. The fluid pressure actuator mechanism of claim 6 in which in each of said piston assemblies said base end is defined by a fixed annular cylinder received in and forming the cylindrical side wall of of said cylinders, said associated intermediate portion being reciprocally and sealingly received on said fixed annular cylinder base end and said piston output end each being reciprocally and sealingly received in the associated intermediate portion;

said fixed annular cylinder base end and said piston intermediate portion and said piston output end of each piston assembly having axially engageable stop means cooperating to limit the axial movements of said intermediate portion relative to said fixed annular cylinder base end and to limit the axial movements of said output end relative to said intermediate portion and said fixed annular cylinder base end during pressure actuation and after release of fluid pressure in said chambers.

8. The fluid pressure actuated actuator mechanism of claim 6 in which each of said base ends of said piston assemblies is defined by the cylindrical side wall of one of said cylinders.

9. The fluid pressure actuated actuator mechanism of claim 8 in which in each of said piston assemblies said movable intermediate portion is received in and mates with said base end in sealed but axially movable relation so as to be retracted into said base end and to be extended axially outwardly of said base end, and in which said movable output end is received in and mates with said intermediate portion in sealed but axially movable relation so as to be retracted into said intermediate portion and to extend axially outwardly from said intermediate portion.

10. A fluid pressure actuated actuator mechanism for a friction clutch located in a clutch housing, the clutch housing having an access opening for installation, removal and replacement of the actuator mechanism and an end wall axially spaced from the friction clutch and providing force reaction for said actuator mechanism, an output shaft extending from the friction clutch through the clutch housing end wall, the friction clutch having a clutch spring disposed coaxially with the output shaft for engaging the clutch, and an axially movable bearing member extending coaxially about the output shaft and being operatively connected with the clutch engaging spring, said clutch being manually disengaged by fluid pressure actuation of said actuator mechanism and engaged by the clutch engaging spring while said actuator mechanism is not fluid pressure actuated, said fluid pressure actuated actuator mechanism comprising:

an actuator mechanism housing having a pair of cylinders each having an axis parallel with and radially spaced from and skew to the longitudinal axis of the output shaft, said actuator mechanism further having a pair of intersecting internal fluid passages spaced from the output shaft and interconnecting said cylinders, and an input port for receiving actuating fluid pressure;

a pair of telescopic piston assemblies slidably disposed in respective ones of said cylinders, each of said piston assemblies having a base end, a movable intermediate portion, a movable output end and a compression spring urging said movable output end axially outwardly relative to said base end, each of said output ends having locating means formed thereon;

force transmitting means having a generally U-shaped open recess receiving the output shaft therethrough, said force transmitting means further having locating means operatively engaging said piston locating means, said force transmitting means abutting the bearing member in compressive force transmitting relation so that said pistons and said force transmitting means and the bearing member are normally always in compressive force transmitting relation and said force transmitting means is located in a predetermined position relative to said cylinders and the bearing member and the output shaft in which the axes of the output shaft, said cylinders and the bearing member are coplanar;

the forces exerted by said compression springs on said piston output ends being transmitted to the bearing member through said force transmitting means and being sufficient to maintain sufficient compressive force transmitting engagement of the bearing member and the clutch spring to prevent the part of the bearing member engaging the clutch spring from rotating relative to the clutch spring but being less compressive force than that required to deactuate the clutch spring and cause disengagement of the clutch;

said force transmitting means, together with said actuator mechanism housing including said pistons, being transversely removable as a unit from about the output shaft and out of the clutch housing access opening, and being installable or replaceable into the clutch housing through the access opening and then about the output shaft, while said force transmitting means is being held in compressive relation to said pistons against the forces of said compression springs with said pistons retracted into said cylinders;

and fluid pressure operated operator means in fluid communication with said internal passages through said input port for selectively supplying fluid pressure through said internal passages to said cylinders so that said pistons will be extended to operate the clutch spring through said force transmitting means and the bearing member to disengage the clutch, the clutch spring being operable to cause retraction of said pistons in said cylinders and engage said clutch when the fluid pressure in said cylinders is released.

* * * * *